(12) United States Patent
Raj et al.

(10) Patent No.: US 8,671,309 B2
(45) Date of Patent: Mar. 11, 2014

(54) MECHANISM FOR ADVANCED SERVER MACHINE CHECK RECOVERY AND ASSOCIATED SYSTEM SOFTWARE ENHANCEMENTS

(75) Inventors: Ashok Raj, Portland, OR (US); Narayan Ranganathan, Portland, OR (US); Mohan J. Kumar, Aloha, OR (US); Theodros Yigzaw, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 13/175,407

(22) Filed: Jul. 1, 2011

(65) Prior Publication Data

US 2013/0007507 A1    Jan. 3, 2013

(51) Int. Cl.
*G06F 11/00* (2006.01)

(52) U.S. Cl.
USPC .......................................... 714/10; 714/38.1

(58) Field of Classification Search
USPC .................... 714/5.11, 10, 11, 38.1
See application file for complete search history.

(56) References Cited

U.S. PATENT DOCUMENTS

| 6,681,345 | B1 * | 1/2004 | Storino et al. ................... 714/42 |
|---|---|---|---|
| 6,748,556 | B1 * | 6/2004 | Storino et al. ................... 714/42 |
| 6,829,684 | B2 * | 12/2004 | Doing et al. ................... 711/152 |
| 7,321,989 | B2 * | 1/2008 | Grayver ....................... 714/38.1 |
| 7,716,521 | B1 * | 5/2010 | Donahue et al. ................. 714/11 |
| 2005/0283712 | A1 * | 12/2005 | Mukherjee et al. ........... 714/764 |
| 2006/0075312 | A1 * | 4/2006 | Fischer et al. ................... 714/48 |
| 2007/0061634 | A1 * | 3/2007 | Marisetty et al. ............... 714/48 |
| 2008/0162988 | A1 * | 7/2008 | Zorek et al. ..................... 714/13 |
| 2009/0144579 | A1 * | 6/2009 | Swanson ........................... 714/3 |
| 2013/0111194 | A1 * | 5/2013 | Grochowski et al. ......... 712/228 |

* cited by examiner

*Primary Examiner* — Marc Duncan
(74) *Attorney, Agent, or Firm* — Blakely, Sokoloff, Taylor & Zafman LLP

(57) ABSTRACT

Embodiments of a hardware processor including a plurality of machine state registers (MSRs) are described. At least one of the MSRs includes an erroring logical processing (ELP) bit which when set, indicates that a particular thread executing on the hardware processor caused an error.

20 Claims, 8 Drawing Sheets

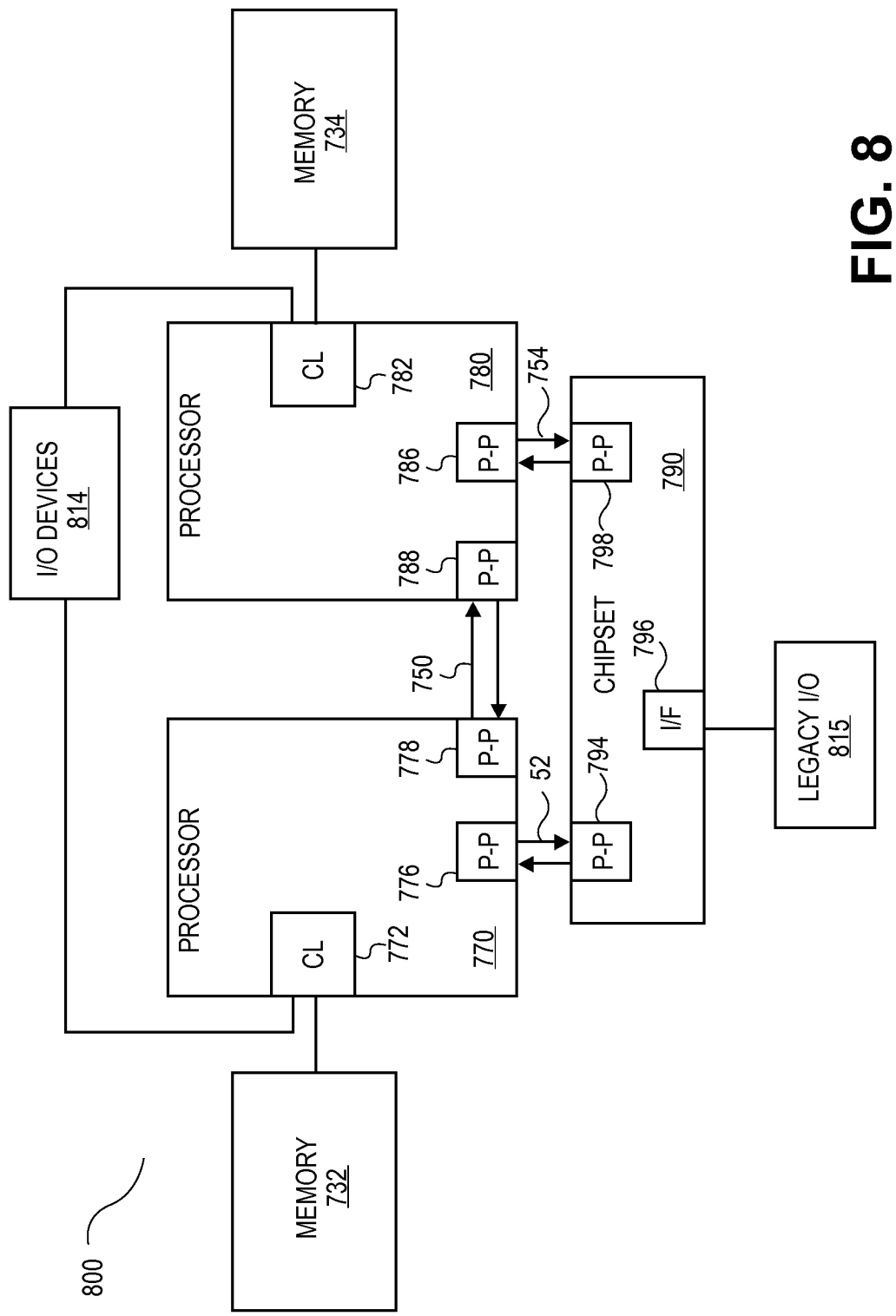

MECHANISM FOR ADVANCED SERVER MACHINE CHECK RECOVERY AND ASSOCIATED SYSTEM SOFTWARE ENHANCEMENTS

BACKGROUND

Many areas of computing, such as servers, etc., call for a very high uptime with little or no downtime. In order to achieve this high uptime, systems designers have built reliability into these platforms at many levels. An example of this reliability is the use of Error Correction Codes (ECC). However, even ECC systems are still susceptible to multi-bit errors that are left uncorrected by hardware. Machine Check Exception (MCE) in processors has been the signaling mechanism to report uncorrected errors to system software and has historically been an unrecoverable event signaled by the processor.

BRIEF DESCRIPTION OF THE DRAWINGS

Embodiments are illustrated by way of example, and not by way of limitation, and will be more fully understood with reference to the following detailed description when considered in connection with the figures in which:

FIG. 8 is a block diagram of a computer system according to one embodiment.

DETAILED DESCRIPTION

Figure 1:
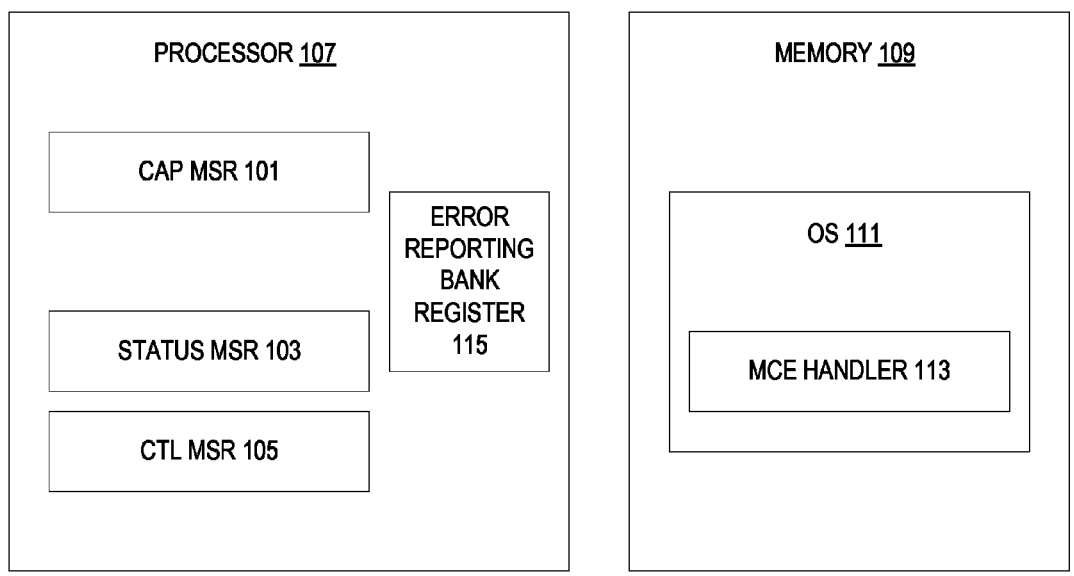
FIG. 1 an embodiment of a processor and several state registers (MSRs).

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations, which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

Software error recovery is fundamentally based on error data information provided by hardware. Typically, a processor logs error signatures in machine check register banks such as those illustrated in FIG. 1. FIG. 1 illustrates an embodiment of a processor 107 and several state registers (MSRs). Other aspects of the processor 107 such as the cores, memory controller, etc. are not shown. The processor 107 is coupled to memory 109 (such as RAM or disk) that stores an operating system 111 and one or more MCE handlers 113.

In some embodiments, these registers include global control machine state registers (MCG MSRs) such as a capabilities register (CAP MSR 101) which provides information about the machine check architecture of the processor, a status register (STATUS MSR 103) which describes the current state of the processor after a machine check exception has occurred, and a control register (CTL MSR 105) which controls the reporting of machine check exceptions. Examples of these registers include IA32_MCG_CAP MSR, IA32_MCG_STATUS MSR, and IA32_MCG_CTL MSR.

In some embodiments, the global status register includes flags for restart IP valid (RIPV), error IP valid (EIPV), and a flag to indicate that the current logical processor is the affected on called erroring logical processing (ELP). In one embodiment, ELP is bit 3 of a 64-bit register. When set RIPV indicates that program execution can be restarted reliably at the instruction pointed to by the instruction pointer pushed on the stack when the machine-check exception is generated. When set EIPV indicates that the instruction pointed to by the instruction pointer pushed onto the stack when the machine-check exception is generated is directly associated with the error. When this flag is cleared, the instruction pointed to may not be associated with the error.

The MCG capabilities register includes a bit (e.g., bit 25) which indicates support for the capability detailed below.

The machine check register bank also includes error-reporting bank registers (one set for each hardware unit) 115 that include at least one control register, status register, address register, and miscellaneous register. The control register controls error reporting of errors produced by a particular hardware unit. The status register contains information related to a machine check error. The address register contains the address of the code or data memory location that produced the machine check error. Examples of error-reporting bank registers include IA32_MCi_STATUS, IA32_MCi_ADDR and IA32_MCi_MISC.

Combined, these registers provide:

An error severity indicator that indicates where the error is corrected, uncorrected etc.

When feasible, a pointer to the instruction that triggered the fault when EIPV in IA32_MCG_STATUS is set (e.g., in the case of DCU poisoning).

An indication if the error currently observed is recoverable by software.

An exact location of the fault (system/physical address) if possible.

Some mechanism to identify the affected logical processor that observed the fault condition.

The hardware provides an indication of the error type (e.g., Instruction Fetch Unit (IFU) poison consumption or Data Cache Unit (DCU) poison consumption) via Machines Check Architectural Error Codes (MCACODs). Status bits like EIPV and RIPV indicate the preciseness of the error location and whether it is safe for software to resume the interrupted context. The latter bits are also overloaded to identify the affected logical processor as described later. The table below shows the setting of some of the bits in the machine check status register in the machine check bank logging the error for the IFU and DCU poison consumption error cases described below.

(UCNA) error in the machine check bank corresponding to the hardware unit that detected the error. There are some cases where the uncorrected errors might be reported by a prior machine check exception instead of a UCNA as in the case of patrol scrub and explicit write-back error types. These latter errors are also called Software Recoverable, no action required (SRAO) errors. In the case of errors in the memory sub-system, the affected region of memory is also tagged as poisoned. In newer processors that support recoverable errors as indicated by IA32_MCG_CAP (bit 24), any subsequent attempt by the processor to consume (read/write) a poisoned location results in a recoverable machine check exception to be signaled with the error code indicating the hardware unit consuming the error location (i.e., instruction fetch—IFU or data fetch—DCU). Both IFU and DCU poison consumption errors are the result of poisoned memory sourced from some agent in the memory hierarchy (MLC, LLC, and Memory Controller) or possibly originating from a PCIE endpoint via Direct Memory Access (DMA). The consumption should be either accompanied or preceded by a UCNA or SRAO error logged with the same physical address range allowing system software to help track the source of the poisoned location.

Embodiments detailed below permits system software to recover from these poison errors in instruction and data streams. Current recovery methods only offer containment models (the recovery action is to terminate the affected thread). The methods detailed herein offer recovery of such conditions without any involvement from application, as far as possible. In cases where such application-independent recovery is not feasible, some application-assisted recovery actions are suggested. Many applications such as database engines and modern file systems (such as ZFS) maintain redundant copies of data, and/or a method to construct such data in some cases. RAID stack is one such case where the kernel agent can be involved in the recovery process.

Currently, software, such as the operating system (OS) running a computing system identifies an affected logical processor by examining the EIPV and RIPV bits in the MCG_STATUS register. In most systems, only the affected logical processor can report EIPV=1. However, there are some instances where EIPV might be reported as 0. These could be due to micro-architectural aspects like speculative and out of order execution. On such processors, IA32_MCG_STATUS might record EIPV=0 and RIPV=0. So, the affected logical processor will be the one that has either EIPV=1, or has EIPV=0 and RIPV=0. Unfortunately, this places unnecessary restrictions on system software recovery actions since these bits are overloaded. RIPV=0 also implies that system software cannot resume the interrupted software context.

TABLE 1

| Type | Valid | Over | UC | EN | MISC V | ADDR V | PCC | S | AR |
|---|---|---|---|---|---|---|---|---|---|
| DataLoad (MCACOD = 0x134) | 1 | 0 | 1 | 1 | 1 | 1 | 0 | 1 | 1 |
| Instruction Fetch (MCACOD-0x150) | 1 | 0 | 1 | 1 | 1 | 1 | 0 | 1 | 1 |

Hardware that is capable of recovery from uncorrected errors provides a unique error log at the time the error is first detected. This first detection is typically reported to system software through a corrected machine check interrupt (CMCI) and logged as an Uncorrected No Action Required An alternative to this (i.e., when hardware must report EIPV=0) is to report the affected logical processor via ELP. This permits hardware to support a combination like EIPV=0, RIPV=1 on the affected logical processor as well. Table 2, illustrated below, shows an example of how ELP helps report this information. An ELP of "1" indicates an affected logical processor regardless of EIPV value.

TABLE 2

| SRAR TYPE | Affected Logical Processor | | | Non-Affected Logical Processor | | |
| --- | --- | --- | --- | --- | --- | --- |
| | ELP | RIPV | EIPV | ELP | RIPV | EIPV |
| Data Load | 1 | 1 | X | 0 | 1 | 0 |
| Instruction Fetch | 1 | 1 | X | 0 | 1 | 0 |

Figure 2:
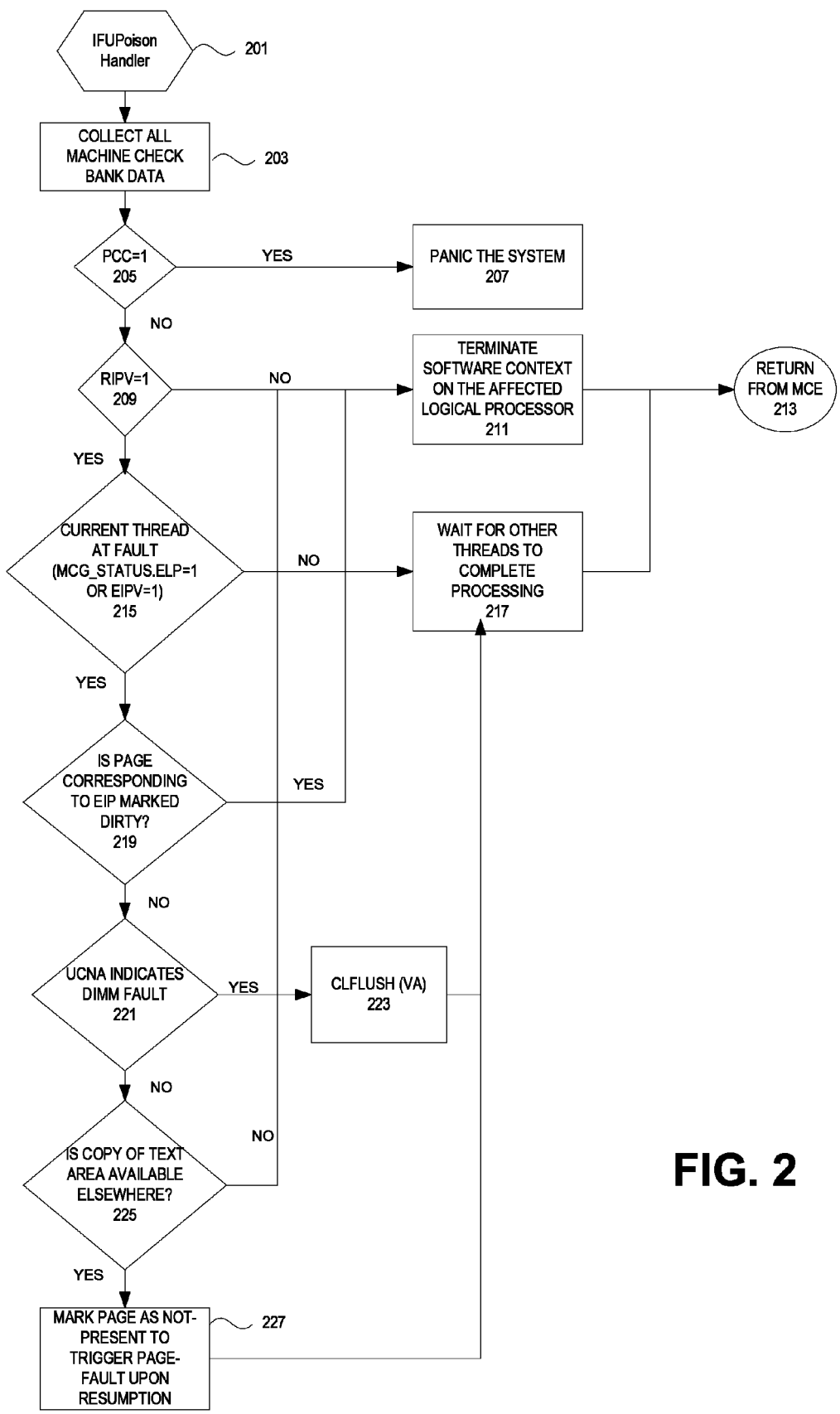
FIG. 2 illustrates an embodiment of a method for software-assisted recovery for handling instruction fetch unit (IFU) poisoning.

Embodiments of IFU and DCU potion consumption recovery actions are detailed below. FIG. 2 illustrates an embodiment of a method for software-assisted recovery for handling instruction fetch unit (IFU) poisoning. This method will work for both non-kernel (user mode code or virtual machine monitor (VMM) guest) and kernel agents. However, one or more of the steps of the detailed method may be omitted depending upon which context is affected.

At 201, the IFU Poison handler is invoked as a result of the hardware signaling IFU poison consumption with relevant fields identifying the thread that took the error. This access may be the result of a call to software IFU MCE routine that is a part of an operating system. In other embodiments, this routine is coded as a part of the firmware of the processor or chipset.

All machine check bank data is collected at 203. This may include collecting data from one or more machine status registers (MSR) and/or error reporting bank registers by a machine check handler of the system software stack. These registers are typically set by a core in the processor. The handler checks the page table bits corresponding to the instruction pointer saved on the stack (plus some number of adjacent pages as guard band to account for speculation) to ensure it is marked not dirty (implying that the pages are unmodified) as detailed below.

A determination of if there is an indication in the machine check bank data that the state of the processor might have been corrupted by a detected error condition and that reliable restarting of the processor may not be possible is made at 205. In one embodiment, this is indicated by a processor context corrupt (PCC) flag in a status register being set (PCC=1). When clear, this flag indicates that the error did not affect the processor's state and that software restarting might be possible.

If yes this indication exists, and therefore no recovery is thought possible, the system is panicked at 207. Typically, the panic that occurs is a kernel panic that the OS must deal with.

If such an indication does not exist, then a determination of if the machine check bank data indicates that program execution can be restarted reliably at the instruction pointed to by the instruction pointer pushed on the stack when the machine-check exception is generated is made at 209. In one embodiment, this is indicated by a restart IP valid flag in a machine status register being set to 1.

If no such indication exists in the machine check bank data, then the software context on the affected logical processor is terminated at 211 and a return from the MCE is made at 213.

If such an indication exists, then a determination is made of if the current thread is at fault is made at 215. This determination may be made several different ways. In some embodiments, a bit in one of the status registers is set to indicate that the current logical processor is the affected one. For example, in some embodiments, a currently unassigned bit (e.g., bit 3 of MCG_STATUS) is set to 1. In other embodiments, if an error IP valid (EIPV) flag is set this indication exists. The EIPV indicates that the instruction pointed to by the instruction pointer pushed onto the stack when the machine check exception is generated is directly associated with the error.

If the current thread is not at fault, then the MCE waits for other threads to complete their processing at 217 and once those threads have completed, then a return from the MCE is made at 213. In some embodiments, thread processing consists of performing other steps of this flow per thread.

If the current thread is at fault, a determination of if the page corresponding to the instruction pointer (e.g., EIP) is marked dirty is made at 219. When the page is marked dirty, the software context on the affected logical processor is terminated at 211 and a return from the MCE is made at 213.

When the page is not marked as dirty, a determination of if there is an uncorrected no action (UCNA) DIMM fault is made at 221. Typically this occurs in the non-kernel context. If the interrupted software stack was executing user mode code (ring3), then in some embodiments page entries are marked as not-present and the cache line(s) (e.g., in a TLB) associated with the virtual address of the DIMM fault is flushed at 223 to force a page fault upon return from the MCE handler. In some embodiments, a data-structure for the page-fault handler to recognize this as an IFU poison recovery scenario is also created.

If there is no UCNA DIMM fault, a decision is made of if there is a copy of text area available elsewhere at 225. Typically, this scenario occurs in kernel code. If the interrupted software stack was executing ring0 kernel code the text may be on a different NUMA node. System software typically does not page kernel text. They are usually pinned and always available. Since a kernel isn't that large, system software implementations may choose to keep a duplicate copy of kernel core, or kernel modules in each NUMA node. Some operating systems and VMMs may choose to do this already for performance reasons. System software can then either adjust the page table mappings to point to that secondary copy. Alternately system software can select a new page from a pre-allocated list to copy the text from the secondary copy to this new page.

If this copy does not exist, the software context on the affected logical processor is terminated at 211 and a return from the MCE is made at 213. When the copy does exist, the page is marked at not present which will trigger a page fault upon resumption of the code from the text area at 227. The MCE will then wait for other threads to complete before returning.

Upon return from MCE handler, the logical processor should encounter a page-fault. A page fault handler will check the relevant information about the fault, remap the faulting address to a new machine page, and copy text over from a spare copy (e.g., another memory node in the system, persistent store, etc.). The system software marks the old page as "bad" and retires it to prevent further use. Upon resuming execution, the processor will fetch and execute the code from the newly remapped (and error free) pages.

Figure 3:
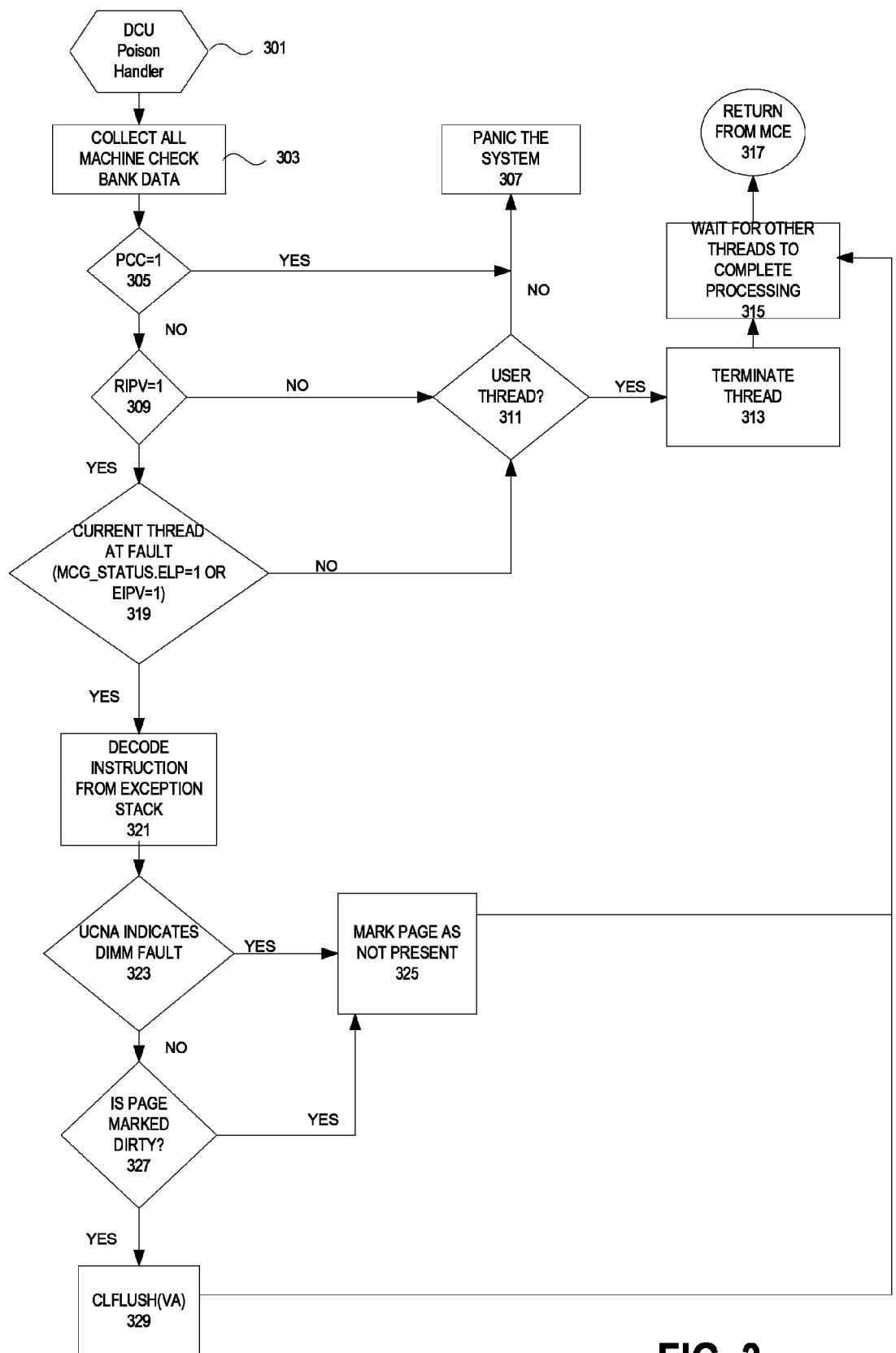
FIG. 3 illustrates an embodiment of a method for software-assisted recovery for handling data cache unit (DCU) poisoning.

FIG. 3 illustrates an embodiment of a method for software-assisted recovery for handling data cache unit (DCU) poisoning. DCU poison recovery is special since data could be modified, pinned for DMA purpose, or simply dirty due to data modification. Application-independent recovery is generally only possible when the data was read-only and not dirty. Also there should be indication that there was no other uncorrected error signaled at that location in memory (e.g., the data location was not previously tagged as poison by the patrol scrubber). In cases where the poison was introduced directly from some hardware unit in the processor (such as MLC, LLC etc.) but the data in memory itself is good, we could attempt to perform recovery by clearing out the poison from the processor caches and reloading the good data from memory as described below.

At 301, the DCU Poison handler is accessed as a result of hardware signaling DCU poison consumption due to a data-load resulting in MCE. This access may be the result of a call to a software DCU routine that is a part of an operating system.

All machine check bank data is collected at 303. This may include collecting data from one or more machine status registers (MSR).

A determination of if there is an indication in the machine check bank data that the state of the processor might have been corrupted by a detected error condition and that reliable restarting of the processor may not be possible is made at 305. In one embodiment, this is indicated by a processor context corrupt (PCC) flag in a status register being set (PCC=1). When clear, this flag indicates that the error did not affect the processor's state and that software restarting might be possible.

If yes this indication exists, and therefore no recovery is thought possible, the system is panicked at 307. Typically, the panic that occurs is a kernel panic that the OS must deal with.

If such an indication does not exist, then a determination of if the machine check bank data indicates that program execution can be restarted reliably at the instruction pointed to by the instruction pointer pushed on the stack when the machine-check exception is generated is made at 309. In one embodiment, this is indicated by a restart IP valid flag (RIPV) in a machine status register being set to 1.

If no such indication exists in the machine check bank data, a determination is made of if this was a user thread is made at 311. If it was not a user thread, the system is panicked at 307. If it was a user thread, the thread is terminated at 313, the MCE waits for other threads to complete DCU poison handling flow at 315, and the MCE returns at 317.

If such an indication exists at 309, then a determination is made of if the current thread is at fault is made at 319. This determination may be made several different ways. In some embodiments, a bit in one of the status registers is set to indicate that the current logical processor is the affected one. For example, in some embodiments, a currently unassigned bit (e.g., bit 3 of IA32_MCG_STATUS) is set to 1. In other embodiments, if an error IP valid (EIPV) flag is set this indication exists. The EIPV indicates that the instruction pointed to by the instruction pointer pushed onto the stack when the machine check exception is generated is directly associated with the error.

If the current thread is not at fault, a determination is made of if this was a user thread is made at 311. If it was not a user thread, the system is panicked at 307. If it was a user thread, the thread is terminated at 313, the MCE waits for other threads to complete DCU poison handling flow at 315, and the MCE returns at 317.

If the current thread is at fault, an instruction from the exception stack is decoded at 321. The virtual address of the instruction is obtained based on stack contents.

A determination of if there is an uncorrected no action (UCNA) DIMM fault is made at 323. If there is such a fault, the page is marked as not present at 325 and the MCE waits for other threads to complete processing. This ensure that the corresponding page frame in system memory did not previously report an uncorrected error. If the corresponding memory page had previously reported an error, recovery might involve application assistance. When there is no UCNA DIMM fault, a decision is made of if the page is marked dirty is made at 327. This may be done by consulting a control register (e.g., CR3) for user space application and see if corresponding page is not dirty. CR3 enables the processor to translate virtual addresses into physical addresses by locating the page directory and page tables for the current task.

If the page is not dirty this indicates that the content in physical memory is good, but poison was introduced in some processor subsystem. The cache line associated with the affected line is flushed at 329, which will cause the line to be invalidated, but the poison will not be written back to memory since the page was not dirty. The next step is to return from the exception handler, which will cause the data to be reloaded from memory and execution to continue.

If the page is dirty or there was previously an error (like patrol scrub MCE) reported at that location in physical memory, then the page is marked as not-present at 325 and execution is resumed. The page fault handler can attempt advanced recovery in case the system software has good copy of the data elsewhere in the system.

Figure 4:
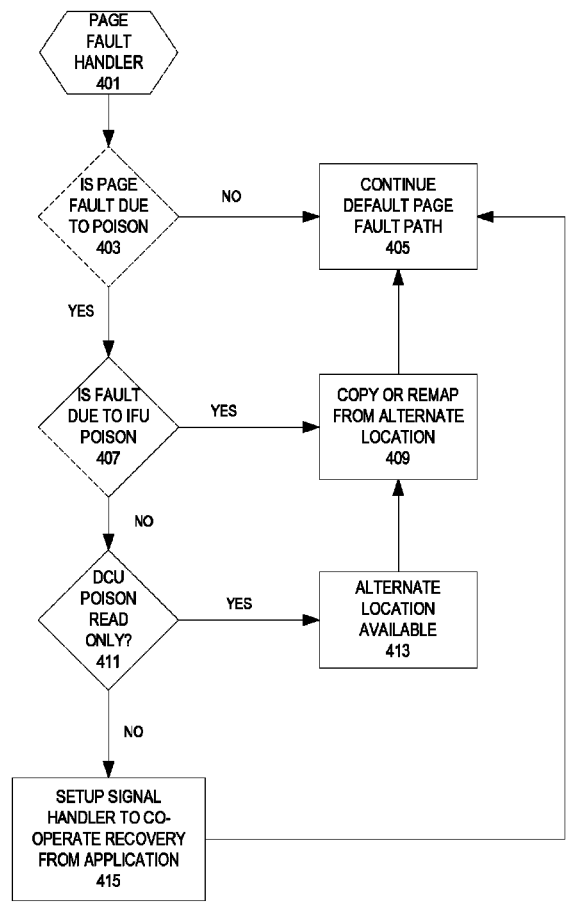
FIG. 4 illustrates an embodiment of a method for page fault handling.

FIG. 4 illustrates an embodiment of a method for page fault handling. At 401, a page fault handler is called. A determination of if the page fault is due to a poison is made at 403. If the page fault was not a result of a poison occurrence, the "default" or normal page fault path is followed at 405.

If the fault was due to a poisoning, the type of poisoning is determined. At 407, a determination of if the fault was due to an IFU poison is made. If the fault was an IFU poison, the appropriate page is copied or remapped from an alternate location at 409 and the default page fault path is followed.

If not an IFU poison, then a determination of if it was a DCU poison is made at 411. If yes and an alternate location is available, the appropriate page is copied or remapped from an alternate location at 409 and the default page fault path is followed if possible.

If the fault is not an IFU or DCU, a setup signal is sent to a handler to cooperatively recover from the application at 415. Enterprise applications such as enterprise database back-ends are very sophisticated. They do have an intimate knowledge of its data and potentially have a mechanism to retrieve them or in some cases simply reconstruct the data based on some other metadata about their archive. There are also certain types of file-systems in some OS/VMMs today that might have a cache that might be replicated. In these scenarios the application may assist in performing the recovery at 415.

In many embodiments, the application registers with the OS kernel stating that it has the ability to support data recovery in case of encountering uncorrected errors. The interface could be an API/syscall for registration or even simply delivered to application via signal stack. The OS kernel arranges the application to return to signal stack, instead of where the error was observed in the instruction flow. The OS kernel also arranges the translation of physical to virtual address to provide the data back to application. The application examines the signal stack contents, obtains the virtual address that encountered the error, and attempts to recover and return from signal handler to continue execution.

The OS kernel should keep some record about the exception on the process stack. In case the application returns and the same error is encountered, the system software should assume error correction wasn't successful by the application and now attempt to terminate the thread that encountered the error.

Figure 5:
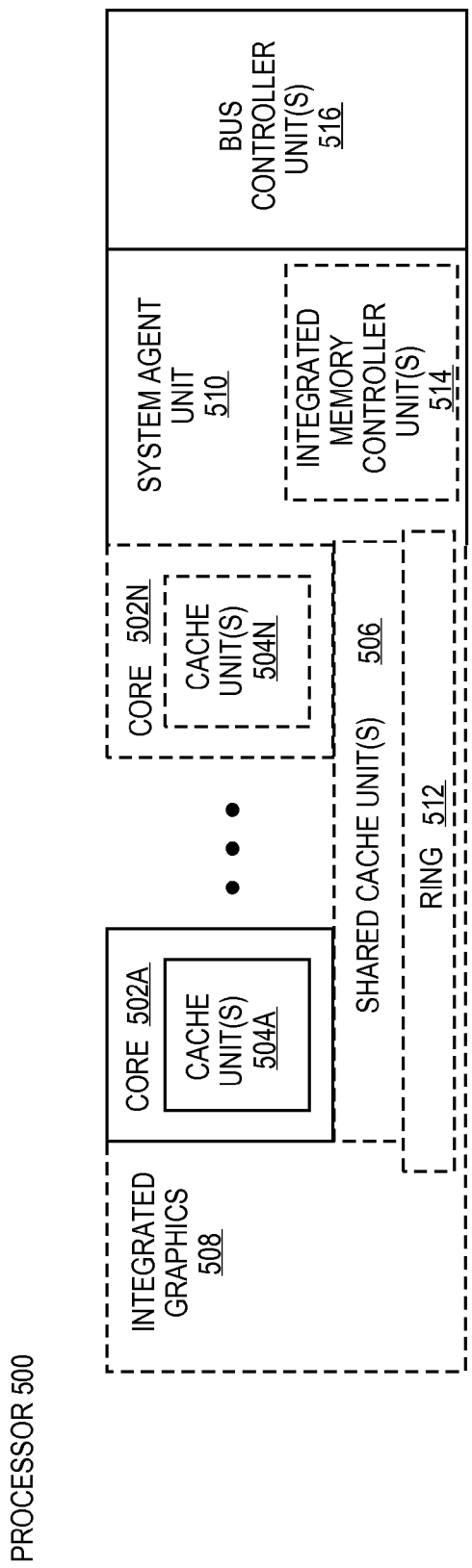
FIG. 5 is a block diagram of a processor according to one embodiment.

FIG. 5 is a block diagram of a single core processor and a multicore processor 500 with integrated memory controller and graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and an integrated graphics logic 508.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508, the set of shared cache units 506, and the system agent unit 510, alternative embodiments may use any number of well-known techniques for interconnecting such units.

In some embodiments, one or more of the cores 502A-N are capable of multi-threading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Figure 6:
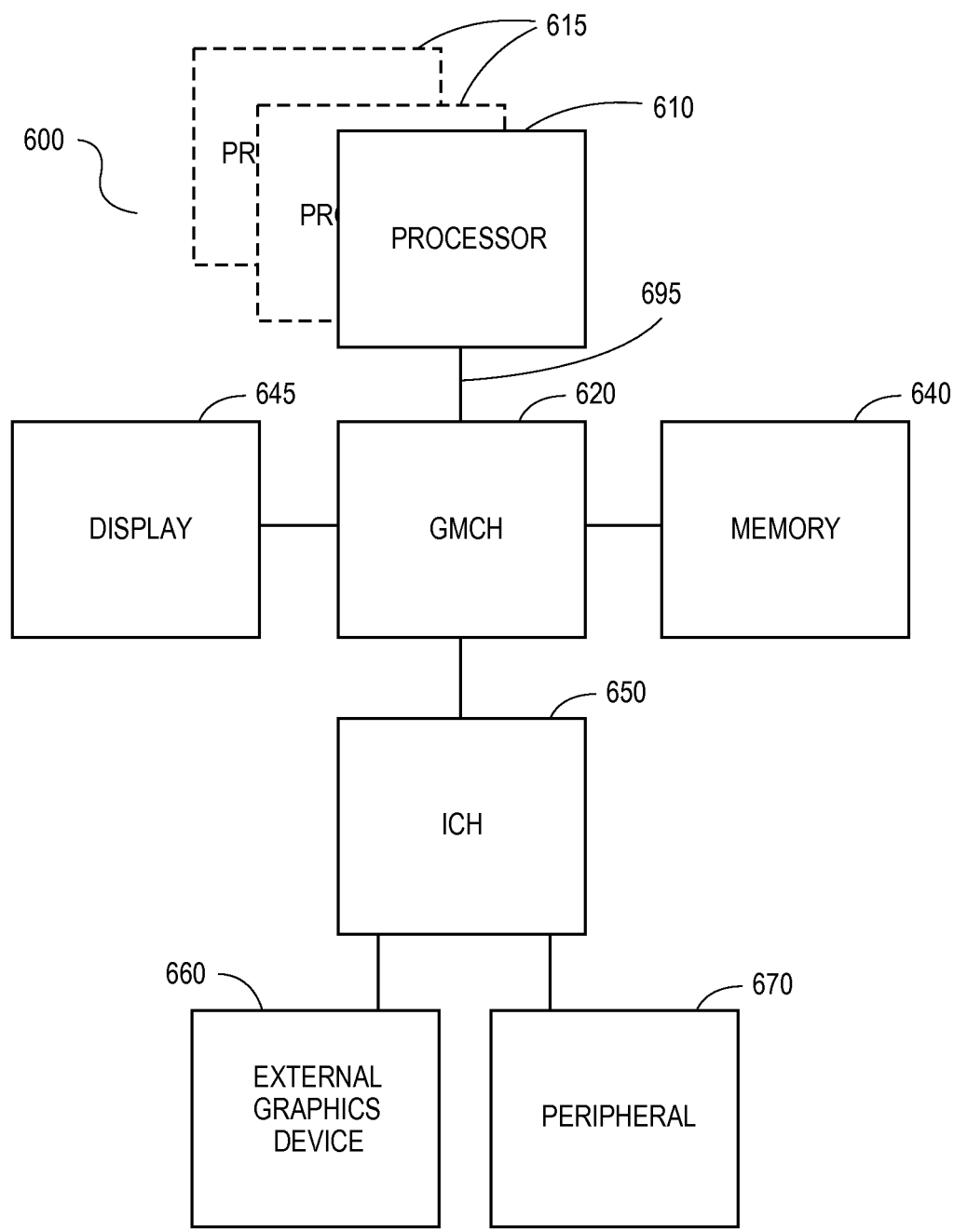
FIG. 6 is a block diagram of a computer system according to one embodiment.
Figure 7:
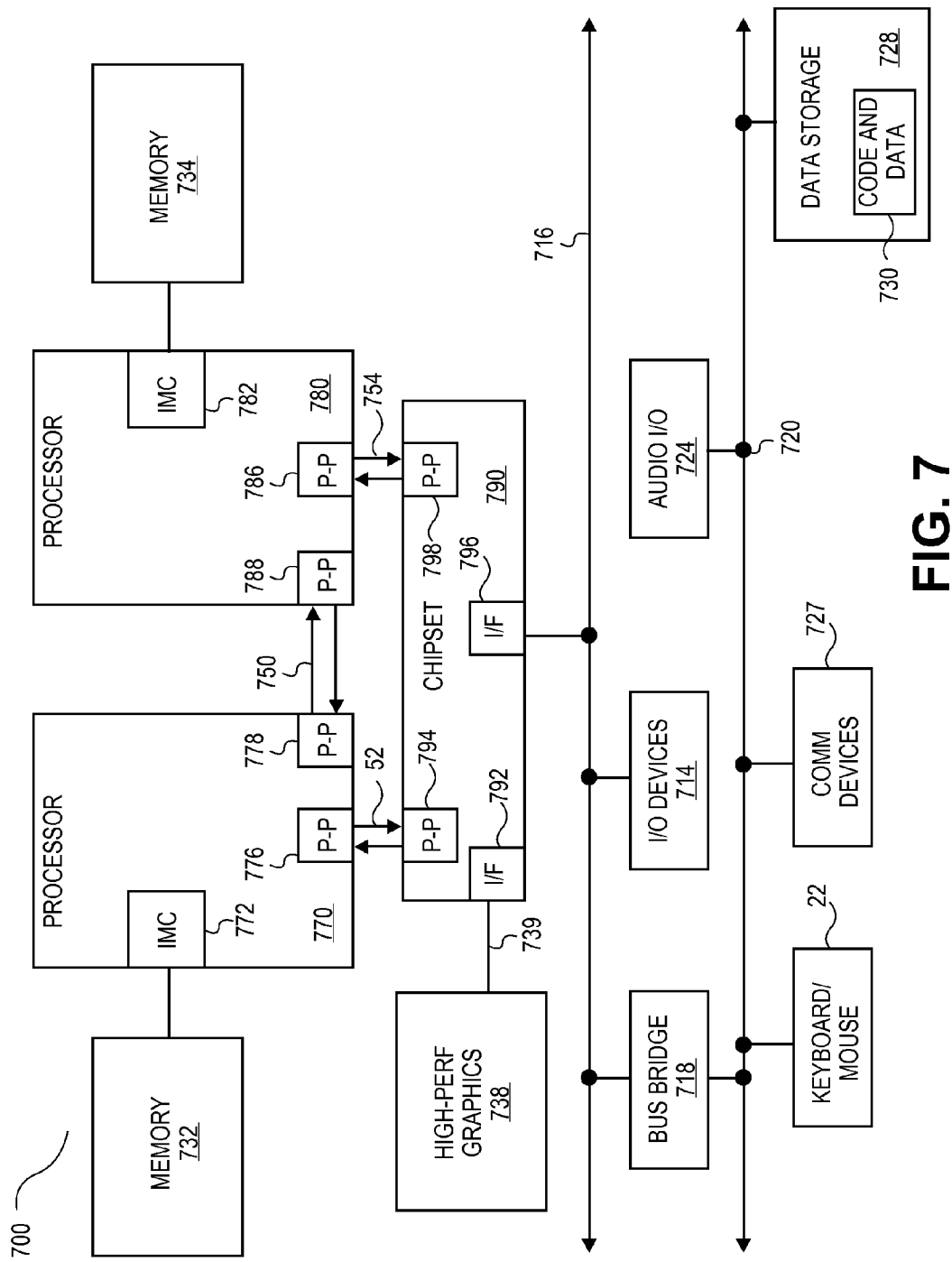
FIG. 7 is a block diagram of a computer system according to one embodiment.

FIGS. 6-8 are exemplary systems suitable for including the processor 500, while FIG. 9 is an exemplary system on a chip (SoC) that may include one or more of the cores 502. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the processor 500. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500 as one or more of the processors 610, 615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Referring now to FIG. 8, shown is a block diagram of a third system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 870, 880 may include integrated memory and I/O control logic ("CL") 872 and 882, respectively. For at least one embodiment, the CL 872, 882 may include integrated memory controller units such as that described above in connection with FIGS. 5 and 7. In addition. CL 872, 882 may also include I/O control logic. FIG. 8 illustrates that not only are the memories 832, 834 coupled to the CL 872, 882, but also that I/O devices 814 are also coupled to the control logic 872, 882. Legacy I/O devices 815 are coupled to the chipset 890.

We claim:

1. A method for software-assisted recovery for handling instruction fetch unit (IFU) poisoning comprising:
   collecting, by a machine check exception (MCE) handler running on a hardware processor, data from at least one machine state register (MSR) that indicates state information regarding one or more instructions that caused an error while being executed by the processor;
   determining if a current thread caused the error by checking an erroring logical processing (ELP) bit of a MSR, wherein when set, the ELP bit indicates that the current thread caused the error; and
   if the current thread did not cause the error, waiting for the other threads to complete processing, and returning from the MCE handler.

2. The method of claim 1, further comprising: setting the ELP bit upon a thread error.

3. The method of claim 1, wherein determining if the current thread is at fault further comprises:
   determining that an error IP valid (EIPV) flag is set, which indicates that the instruction pointed to by an instruction pointer pushed onto the stack when the MCE is generated is directly associated with the error.

4. The method of claim 1, further comprising:
   determining if a processor context corrupt (PCC) flag in a MSR indicates that the error affected the hardware processor's state; and
   panicking in response to a determination an affected hardware processor state from the PCC flag such that an operating system is responsible for handling the error.

5. The method of claim 1, further comprising:
   determining if the collected data indicates that program execution can be restarted reliably at the instruction pointed to by the instruction pointer pushed on the stack when the MCE was generated; and
   terminating a software context on the affected logical processor in response to the determination that program execution cannot be restarted.

6. The method of claim 5, wherein an indication that program execution can be restarted is a restart IP valid flag in a MSR being set to 1.

7. The method of claim 1, further comprising:
   determining that a page corresponding to an instruction pointer associated with the error causing instruction is not dirty;
   determining that there is an uncorrected no action (UCNA) DIMM fault; and
   flushing at least one cache line associated with a virtual address of the UCNA DIMM to force a page fault upon return from the MCE handler.

8. The method of claim 1, wherein the one or more instructions that caused the IFU poisoning are a part of kernel code.

9. The method of claim 1, wherein the one or more instructions that caused the IFU poisoning are a part of non-kernel code.

10. The method of claim 1, further comprising:
    determining if the collected data indicates that program execution can be restarted reliably at the instruction pointed to by the instruction pointer pushed on the stack when the MCE was generated; and
    determining if the current thread is a user thread,
        panicking in response to a determination that the current thread is not a user thread, and
        when the current thread is a user thread,
            terminating the current thread,
            waiting for other threads to complete processing, and
            returning from the MCE handler.

11. The method of claim 10, wherein an indication that program execution can be restarted is a restart IP valid flag in a MSR being set to 1.

12. A method for software-assisted recovery for handling data cache unit (DCU) poisoning comprising:
    collecting, by a machine check exception (MCE) handler running on a hardware processor, data from at least one machine state register (MSR) that indicates state information regarding one or more instructions that caused an error while being executed by the processor;
    determining if a current thread caused the error by checking an erroring logical processing (ELP) bit of a MSR, wherein when set, the ELP bit indicates that the current thread is at fault; and
    if the current thread did not cause the error,
        determining if the current thread is a user thread,
        panicking in response to a determination that the current thread is not a user thread, and
        when the current thread is a user thread,
            terminating the current thread, waiting for other threads to complete processing, and returning from the MCE handler.

13. The method of claim 12, further comprising: setting the ELP bit upon a thread error.

14. The method of claim 12, wherein determining if the current thread caused the error further comprises:
   determining that an error IP valid (EIPV) flag is set, which indicates that the instruction pointed to by an instruction pointer pushed onto the stack when the MCE is generated is directly associated with the error.

15. The method of claim 12, further comprising:
   determining if a processor context corrupt (PCC) flag in a MSR indicates that the error affected the hardware processor's state; and
   panicking the system in response to a determination an affected hardware processor state from the PCC flag.

16. The method of claim 12, further comprising:
   if the current thread did cause the error, decoding the error causing instruction from an exception stack;
   determining that there is an uncorrected no action (UCNA) DIMM fault;
   marking a page associated with the decoded error causing instruction as not present;
   waiting for other threads to complete processing; and
   returning from the MCE handler.

17. The method of claim 12, further comprising:
   if the current thread did cause the error, decoding the error causing instruction from an exception stack;
   determining that there is an not an uncorrected no action (UCNA) DIMM fault;
   determining that a page associated with the decoded instruction is not marked dirty;
   marking a page associated with the decoded error causing instruction as not present;
   waiting for other threads to complete processing; and
   returning from the MCE.

18. A system comprising:
   a hardware processor comprising a plurality of machine state registers (MSRs), wherein a first one of the MSRs includes an erroring logical processing (ELP) bit which when set, indicates that a particular thread executing on the hardware processor caused an error;
   a machine check exception (MCE) handler stored in memory to run on the hardware processor to collect data from at least one of the MSRs that indicates state information regarding one or more instructions that caused an error while being executed by the processor, wherein the MCE handler to determine if a current thread caused the error by checking an erroring logical processing (ELP) bit of a MSR, wherein when set, the ELP bit indicates that the current thread caused the error and if the current thread did not cause the error, waiting for the other threads to complete processing, and returning from the MCE handler.

19. The system of claim 18, wherein one of the plurality of MSRs to store an indication of support for software-assisted recovery for handling instruction fetch unit (IFU) poisoning.

20. The system of claim 18, the hardware processor further comprising:
   a plurality of error-reporting registers including at least one control register to control error reporting of errors produced by a particular hardware unit of the system, an address register to store an address of a location that produced a machine check error, and a status register to contain information related to a machine check error.

* * * * *